G. A. ANDERSON.
ROTARY SHOVEL.
APPLICATION FILED NOV. 6, 1916.

1,245,656.

Patented Nov. 6, 1917.

INVENTOR.
G. A. Anderson.
BY S. Geo. Stevens.
ATTORNEY.

UNITED STATES PATENT OFFICE.

GUSTAV A. ANDERSON, OF CROSBY, MINNESOTA.

ROTARY SHOVEL.

1,245,656. Specification of Letters Patent. Patented Nov. 6, 1917.

Application filed November 6, 1916. Serial No. 129,704.

*To all whom it may concern:*

Be it known that I, GUSTAV A. ANDERSON, a citizen of the United States, residing at Crosby, in the county of Crow Wing and State of Minnesota, have invented certain new and useful Improvements in Rotary Shovels, of which the following is a specification, reference being had therein to the accompanying drawing.

This invention consists of certain improvements in rotary shovels and relates particularly to such devices used in connection with excavating and loading machines for handling granular material such as sand, gravel, coal, or iron ore.

In the class of machines above referred to, there is usually employed a forwardly extending adjustable leg or boom carrying conveying devices of some sort such as an endless chain of buckets or endless belt for conveying the material engaged to the rear of the machine where it may be cared for in various ways, such as being dumped into tram cars, or the like. The material engaged by such machines may be in loose piles such as stock piles, or it may be as found in its original deposit in the earth and to form a simple, practical and efficient shovel for such machines is the object of my present invention.

In the art of mining iron ore, such loading machines are frequently employed and it is to the forward end of the conveyer boom of one of such machines that I have shown my improved rotary shovel attached in the accompanying drawings in which like reference characters indicate like parts, and in which, Figure 1 is a horizontal sectional view through the center of my rotary shovel illustrating some of the parts in perspective.

Figure 1:
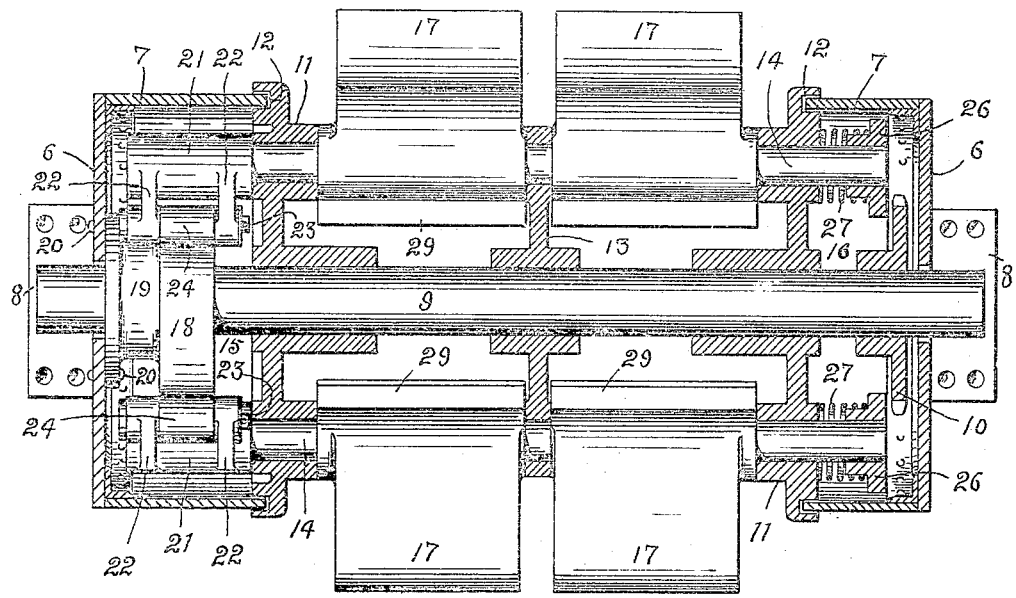
Figure 2:
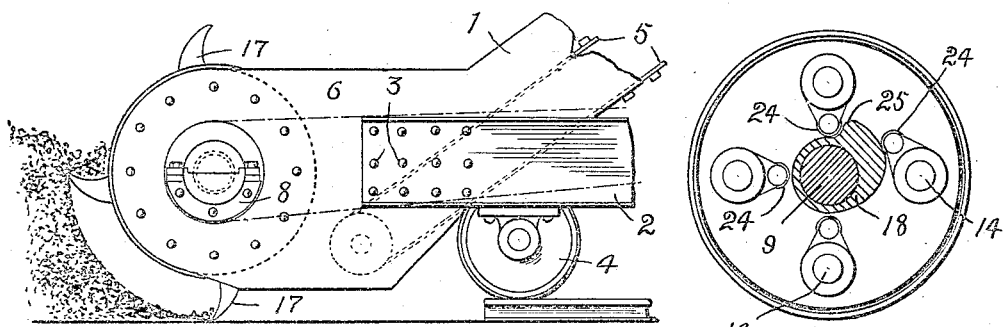
Fig. 2 is a side elevation of the shovel as applied to the conveyer boom.
Figure 3:
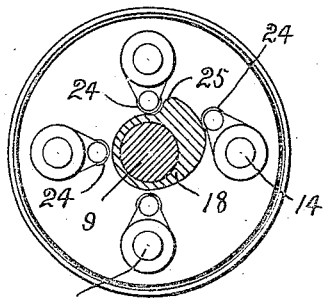
Fig. 3 is an end elevation of the shovel drum illustrating the tripping apparatus.
Figure 4:
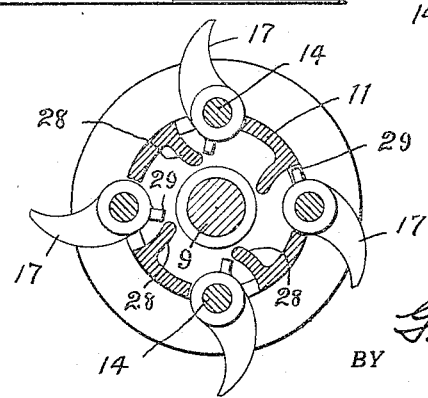
Fig. 4 is a transverse sectional view through the shovel drum adjacent one end of the shovel hubs.

I have illustrated each side of the boom as of fabricated metal construction, comprising an inclined member 1 and horizontal member 2, riveted together as at 3 and which may be either temporarily or permanently supported upon any desirable arrangement of wheels 4. Within this boom and intermediate the sides thereof, in any desired manner is supported the endless conveying element 5 which may be a line of buckets or belt, as preferred, and which does not constitute part of my present invention.

The inclined members 1—1 are formed with horizontal deep extensions 6, terminating in semi-circular form and each having securely fastened thereto an inwardly extending circular open ended drum head 7—7. Upon the exterior of each of the extensions 6—6 is fixed a journal box 8 in which is revolubly mounted a shaft 9 which is illustrated as receiving its power from a sprocket wheel 10 attached thereto and being driven by any suitable arrangement of sprocket chain, not shown.

Rigidly fixed upon the shaft 9 and intermediate the heads 7—7 is mounted a drum 11, it having formed annular grooves 12—12 in the ends thereof, and into which grooves the ends of the head 7—7 loosely fit to prevent dirt readily entering therein. A central spider 13 is formed in the drum integral therewith and through which spider and the ends of the drum are revolubly mounted four radially equi-distant rockable shafts 14, all of which extend beyond the ends of the drum and into the chambers 15 and 16 formed by the drum heads 7—7.

Upon each shaft 14 is rigidly fixed a pair of radially extending scoop shaped shovel blades 17—17, there being one of such blades intermediate each end of the drum and the spider 13 thereof, these blades extend considerably beyond the peripheral edge of the ends of the drum and are for the purpose of gathering up the granular material engaged, carrying it over the drum and discharging it upon the conveyer belt 5. Each pair of shovels as they reach their uppermost position during the revolution of the drum are suddenly accelerated by the action of the cam 18, loosely surrounding the shaft 9 in the chamber 15 and rigidly fixed by its flanged hub 19 being bolted as at 20 to the extension 6. Such action is produced by each shaft 14 having rigidly fixed upon the end thereof within the chamber 15 a hub 21 carrying two radially extending arms 22 revolubly supporting therebetween on a suitable pin 23, a roller 24, and which roller contacts the surface of the cam. Thus as the drum revolves, carrying the shovels with it and the cam being stationary, the rollers 24 revolve thereabout and the cam having an abrupt extension 25 thereupon just above the center of the shaft, each roller 24, when it engages the extension will suddenly become retarded in its revolving motion and thereby accelerate the forward motion of the shovels upon the shaft 14 carrying such roller.

The object of this sudden forward motion is to free the material carried by the shovels therefrom and to throw it forwardly upon the conveyer 5.

The shovels then maintain an abnormal forward position during the remainder of their downward stroke, extend a less distance radially from the drum which permits of the lower end of the conveyer belt being positioned closer to the drum than would otherwise be possible and a double advantage is thus derived by such construction. To assist the shovels in maintaining a normal radial position as when engaging the material to be shoveled, I provide a hub member 26 fixed to the extreme end of each shaft 14 extending within the chamber 16, and upon each of which hubs is carried a spiral spring 27, the end adjacent the hub being tightly secured thereto and the opposite end secured within the face of the end of the drum 11. These springs when put in place are spirally tightened in such a manner as to normally exert a backward revolving stress upon the respective shaft 14. These springs may or may not be employed as the gravity of the shovels alone may be sufficient to rock the shafts back into position after being operated by the cam. Adjacent the hub portion of each shovel 17 and spaced a distance therefrom, is formed an inwardly projecting web 28, the face of which next the hub is of a contour corresponding to that of the hub, and a radially extending member 29 formed integral with each hub and the full length thereof sweeps the space intermediate the hub and the web 28 when the shafts are rocked, thus preventing any of the granular material from entering the hub or retarding the rocking motion of the shafts.

It is evident that various modifications within the scope of the invention may be resorted to without departing from the spirit thereof.

Having thus described my invention what I claim and desire to secure by Letters Patent, is—

1. A rotary shovel of the character described, comprising a supporting member, a driven shaft within said member and carrying fixed thereto a drum, radially extending shovel blades carried by the drum and means whereby the shovel blades are suddenly thrust forwardly for prematurely discharging gathered material from the shovels.

2. A rotary shovel of the character described, comprising a supporting member, a driven shaft within said member, a drum rigidly fixed to the shaft and revolved thereby, a plurality of rockable shafts carried by the drum and spaced radially a distance from the first mentioned shaft, radially projecting shovel blades carried by the rockable shafts, means at one end of the drum for successively accelerating the discharge motion of the shovels upon the various rockable shafts and means at the opposite end for holding the shafts normally in a predetermined position.

3. A rotary shovel of the character described, comprising a supporting member, a driven shaft within the member, a drum fixed to the shaft, a plurality of shovel carrying rockable shafts carried by the drum, a cam surrounding the first mentioned shaft and at one end of the drum said cam being fixed to the supporting member, rollers carried by the rockable shafts and engaging the cam and means whereby the shovel carrying shafts are successively rocked in such a manner as to thrust suddenly forwardly the shovels thereupon as the rollers pass about the cam substantially as and for the purpose described.

4. A rotary shovel of the character described, comprising a supporting member, a driven shaft within said member, a drum fixed to the shaft and revolved thereby, a plurality of shovel carrying shafts mounted within the drum and parallel with the shaft thereof, means at one end of the drum for intermittently rocking the shovel carrying shafts and means at the opposite end of the drum for holding the shafts normally in a predetermined position.

5. In an excavator, the combination of a suitable support, a shaft non-rotatively fixed within the support, a drum rotatively mounted upon the shaft and carrying a plurality of shafts therein, parallel with the drum shaft and spaced equidistant therefrom, radially extending shovels carried by the last mentioned shafts and means for intermittently, successively accelerating the rotary motion of the shovels as they revolve with the drum whereby the load carried by the shovels is suddenly thrown forward therefrom at the time of such acceleration.

6. A rotary shovel of the character described, comprising a supporting member, a driven shaft within said member and carrying fixed thereto a drum, hollow fixed drum heads at each end of the drum, radially extending shovel blades carried by the drum, means within one hollow drum head for accelerating the discharge motion of the shovels and means within the opposite drum head for holding the shafts normally in a predetermined position.

In testimony whereof I hereunto affix my signature in the presence of two witnesses.

GUSTAV A. ANDERSON.

Witnesses:
C. C. FERGUSON,
M. B. ELLINGSON.